Jan. 9, 1968　　　　　C. C. SIMS　　　　3,363,118
RADIALLY DRIVEN FLEXURE PLATE TRANSDUCER
Filed March 18, 1965

INVENTOR
CLAUDE C. SIMS

BY Melvin L. Crane, Agent

ATTORNEY

United States Patent Office 3,363,118
Patented Jan. 9, 1968

3,363,118
RADIALLY DRIVEN FLEXURE PLATE
TRANSDUCER
Claude C. Sims, Orlando, Fla., assignor to the United
States of America as represented by the Secretary of
the Navy
Filed Mar. 18, 1965, Ser. No. 440,960
6 Claims. (Cl. 310—8.7)

ABSTRACT OF THE DISCLOSURE

This invention is directed to a radially driven flexure plate transducer which includes a pair of ring-like piezoelectric elements mounted coaxially in spaced relationship within grooves in a base material. The elements are polarized in the same direction and connected to an alternating electrical potential in phase opposition. Each of the elements deform in opposite directions due to an applied potential or a force on the base material to respectively produce either sound waves or an electrical current flow. The transducer element is held in place by a ring about the outer surface of the base or by a holder secured to the base on the axis thereof.

---

The invention described herein may be manufactured and used by or for the Government of the United States of America for governmental purposes without the payment of any royalties thereon or therefor.

The present invention relates to an electromechanical transducer for use in air or water as a hydrophone for converting compressional wave energy into alternating electrical energy and/or as a projector for converting alternating electrical energy into compressional wave energy and more particularly to an improved light weight, high power electroacoustic transducer.

Heretofore electromechanical transducers have been made in various forms such an annular elements, flat plates and as cylindrical bar shaped elements. Such transducers are usually large, heavy, expensive, and difficult to assemble. Light weight transducers formed heretofore require the use of a considerable amount of piezoelectric or electrostrictive material to form the final device thereby requiring the use of large amounts of the material.

It is therefore an object of the present invention to provide a light weight, high power electroacoustic transducer for use in a fluid medium to provide a sensitive listening and/or transmitting device.

Another object is to provide an effective transducer having a small amount of active piezoelectric or electrostrictive material to provide a sensitive device.

Still another object is to provide a simple, relatively, inexpensive, radially driven flexure plate transducer.

Other objects and advantages of this invention will be readily appreciated as the same becomes better understood by reference to the following detailed description when considered in connection with the accompanying drawing, wherein.

Figure 1:
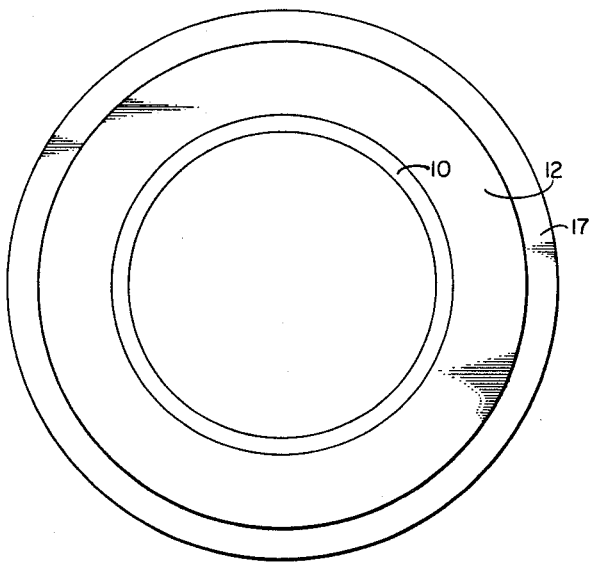
FIG. 1 is a top view of the device.

Broadly, the present invention includes a pair of cylindrical or ring-like piezoelectric or electrostrictive elements coaxially mounted in spaced relationship within a solid metallic or epoxy annular holding element or base material. Each of the ring-like elements are provided with thin films of electrical conductive material on the inner and outer radial surfaces thereof to which a changing electrical potential is connected. The annular elements are polarized in the same direction and are of the type that are deformed by a changing electrical potential which in the instant invention are connected in phase opposition electrically. The change in shape of the holding element including the ring-like elements may be from a flat shape, in the absence of applied potential or a deforming force, to a dish-shape, or from dish-shape to a greater or lesser dish-shape, depending on the amount of applied potential or force from the fluid within which the device is operated. The holding material in which the deformable elements are assembled is sufficiently stiff relative to anticipated axial force so that there is significant displacement therein as a result thereof, but is readily compliant to anticipated dynamic forces normal to the faces of the device so as not to materially resist deformation of the annular elements to a significant degree when the annular elements are subjected to a selected range of alternating potential or a selected range of varying force. The ring-like elements are positioned relative to each other in an axial arrangement such that when a changing potential is applied to the electrical terminals of each of the ring-like elements, 180 degrees out of phase, one element expands while the other compresses to bend the base material into a dish-shape. The bending of the base, operating against the fluid within which the device is positioned acts on the fluid in the well known manner to produce a sound wave. Likewise, a fluid force on the base material acts on the ring-like elements to produce electrical pulses as is well known in the art. The device may be supported from opposite points on the radial face or from the center of one face on the axis.

Now referring to the drawing, there is shown by illustration in the separate views an electroacoustic transducer made in accordance with the present invention. As shown, the transducer element comprises coaxial substantially identical ring-like or cylindrical ceramic elements 10 and 11 of piezoelectric or electrostrictive material potted or embedded into a metal or plastic circular plate 12. The ring-like elements are provided with thin film electrodes 13 and 14 respectively, on the inner and outer radial surfaces thereof. The electrodes 13 and 14 constitute electrical means for associating the ring-link elements with an electrical potential or electrical circuitry through lead lines 15 and 16. When an electrical potential is impressed between the electrodes 13 and 14, the direction of the electric field in the elements 10 and 11 is radial, which field causes the elements to compress or expand radially depending on the polarity. The two ring-like ceramic elements are polarized in the same direction and connected in phase opposition electrically. Thus, one ring-like element will be under compression when the other ring-like element is under expansion. The effect of the application of an electrical potential on the film electrodes and through the ring-like elements deforms the plate into a dish-shape such as shown in phantom in FIG. 3. With no electrical potential applied to the ceramic elements the plate is flat as shown in solid lines, FIG. 3. The degree that the plate is flexed into a dish-shape depends on the applied potential, and the flexing of the plate transmits sound waves to the fluid within which the device is operated. Likewise sound waves propagating through the surrounding fluid flexes the plate which in turn compresses the ceramic ring elements to produce an electrical current. The electrical current is then amplified and received as an electrical or sound signal as is well known in the art. The transducer device may be held at the outer edge by a support ring 17.

The position of the ceramic rings in the plate material may be anywhere depending upon the desired flexural mode in the plate. For best performance, and for the greatest motion for the smallest amount of material in the ceramic ring element, the ceramic element is placed at the node of the flexure plate. Thus, the present invention provides an electroacoustic transducer which is light feight, sensitive and provides considerable volume velocity per volume of ceramic material.

Figure 2:
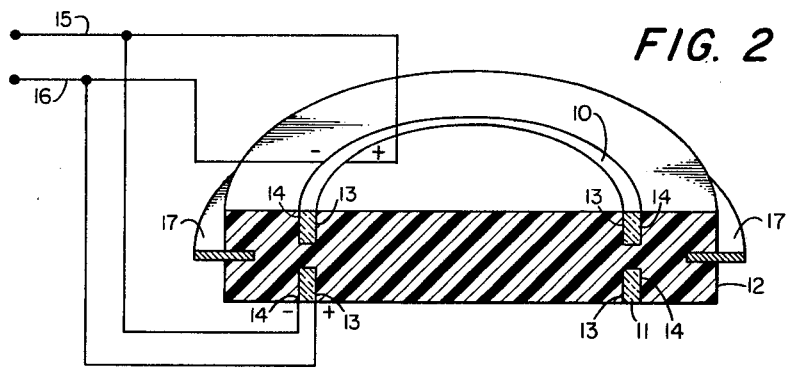
FIG. 2 is a cross sectional view in perspective.
Figure 3:
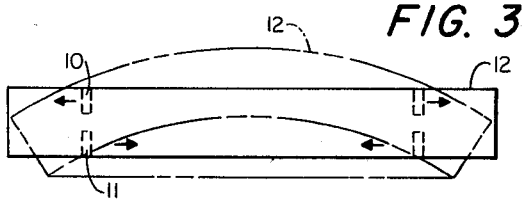
FIG. 3 is a view illustrating the bending action of the device in phantom.

In operation for sending a sound wave signal, when an alternating voltage is applied to the ring-like elements in phase opposition as shown in FIG. 2, strains, such as contraction and expansion develop radially in the rings. Because the radial strains in the ceramic rings are in opposite directions the base plate within which the rings are embedded flexes or dishes similar to a bimetallic element in changing temperature. With the plate secured in place, a diaphragm action results from the plate changing in a concavo-convex shape due to the expansion and contraction of the ring elements. One such flexure is illustrated in FIG. 3.

For receiving a sound signal, the sound waves through the medium within which the transducer is placed applies a changing force on the plate which flexes the plate. Flexure of the plate, compresses one ring while contracting the other ring, to produce a changing voltage in the ring elements and across the electrodes. The resonant frequency is a function of the material, thickness and diameter of the plate. Therefore the plate material must be sufficiently compliant to the force applied normal thereto to present a comparatively low resistance to deformation while being sufficiently stiff to preclude too great a change. Thus, the operation of the transducer device is the same as is well known in the art.

Obviously many modifications and variations of the present invention are possible in the light of the above teachings. It is therefore to be understood that within the scope of the appended claims the invention may be practiced otherwise than as specifically described.

What is claimed is:
1. An electroacoustic transducer which comprises:
    a base plate of flexible material,
    first and second identical cylindrical elements of the type which are deformable by applied changing potential to manifest changing concavo-convex shape, and when deformed by changing applied force in turn providing a potential that changes as a function of the applied force,
    said cylindrical elements having equal radii and embedded in said flexible material coaxial therewith in axial alignment in spaced relationship axially,
    each of said cylindrical elements being polarized in the same direction radially,
    said flexible material being sufficiently compliant to said applied force directed normal thereto to present comparatively low resistance to deformation of said cylindrical elements while being sufficiently stiff to preclude significant change,
    thin film electrodes on the inner and outer radial faces of each of said cylindrical elements, and
    said thin film electrodes of each of said cylindrical elements connected with a pair of electrical leads in phase opposition electrically.
2. An electroacoustic transducer as claimed in claim 1 wherein:
    said identical cylindrical elements are of a piezoelectric material.
3. An electroacoustic transducer as claimed in claim 1 wherein:
    said identical cylindrical elements are an electrostrictive material.
4. An electromechanical transducer comprising:
    a base plate of flexible material,
    a pair of substantially identical ring shaped ceramic material elements having equal radii and embedded in said flexible base plate coaxial therewith in axial alignment in spaced relationship axially,
    each of said ring shaped ceramic material elements being polarized in the same direction radially,
    thin film electrodes on the inner and outer radial faces of each of said ring shaped elements connected with a pair of electrical leads in phase opposition electrically,
    said pair of ring shaped elements responsive to an alternating potential applied to said pair of electrical leads to alternately dish in one direction and in the opposite direction in accordance with the polarity and amplitude of the applied alternating potential,
    said pair of ring shaped elements having the characteristics of deforming by applied force to produce an electrical output varying with the degree of deformation, and
    said flexible material being sufficiently compliant to said applied force directed normal thereto to present comparatively low resistance to deformation of said ring shaped elements while being suficiently stiff to preclude significant change.
5. An electromechanical transducer as claimed in claim 4 wherein:
    said ring shaped ceramic material elements are formed of a piezoelectric material.
6. An electromechanical transducer as claimed in claim 4 wherein:
    said ring shaped ceramic material elements are formed of an electrostrictive material.

References Cited
UNITED STATES PATENTS

| | | | |
|---|---|---|---|
| 3,209,176 | 9/1965 | Paley | 310—8.2 |
| 3,198,970 | 8/1965 | Kritz | 310—8.2 |

MILTON O. HIRSHFIELD, *Primary Examiner.*

J. D. MILLER, *Assistant Examiner.*